(12) United States Patent  (10) Patent No.: US 6,886,932 B2
Rudolph                     (45) Date of Patent:     May 3, 2005

(54) INK JET PRINTING (75) Inventor: Michael Lee Rudolph, Newark, DE (US)

(73) Assignee: E.I. Du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 10/832,591

(22) Filed: Apr. 27, 2004

(65) Prior Publication Data

US 2004/0196347 A1 Oct. 7, 2004

Related U.S. Application Data (62) Division of application No. 10/264,859, filed on Oct. 4, 2002, now Pat. No. 6,742,869
(60) Provisional application No. 60/327,119, filed on Oct. 4, 2001.

(51) Int. Cl.[7] .................................................. B41J 2/01
(52) U.S. Cl. ........................ 347/100; 347/95; 106/31.6
(58) Field of Search .......................... 347/100, 95, 96, 347/101; 106/31.6, 31.13; 523/160

(56) References Cited

U.S. PATENT DOCUMENTS

| 5,085,698 A | * | 2/1992 | Ma et al. .................... 347/100 |
| 5,231,131 A | | 7/1993 | Chu et al. |
| 5,272,201 A | | 12/1993 | Ma et al. |
| 5,519,085 A | | 5/1996 | Ma et al. |
| 5,949,967 A | | 9/1999 | Spaulding et al. |
| 6,309,452 B1 | * | 10/2001 | Beach et al. ............. 106/31.27 |
| 6,488,751 B1 | * | 12/2002 | Takemoto ................. 106/31.13 |
| 6,530,986 B2 | * | 3/2003 | Walker et al. ............. 106/31.6 |
| 2003/0008938 A1 | * | 1/2003 | Sano et al. ................. 523/160 |
| 2003/0097961 A1 | * | 5/2003 | Yatake et al. ............ 106/31.59 |

FOREIGN PATENT DOCUMENTS

| EP | 0 720 351 A2 | 7/1996 |
| EP | 0 992 551 A | 11/1996 |
| EP | 0 828 381 A2 | 3/1998 |
| EP | 0 974 626 A | 1/2000 |
| EP | 1 111 017 A | 6/2001 |
| EP | 1 139 654 A2 | 10/2001 |
| WO | WO 96/34762 | 11/1996 |
| WO | WO 01/48100 | 7/2001 |

OTHER PUBLICATIONS

PCT Internation Search Report (CT/US02/33308) dated Oct. 6, 2003.

* cited by examiner

Primary Examiner—Manish Shah
(74) Attorney, Agent, or Firm—Bart E. Lerman (57) ABSTRACT This invention pertains to ink jet printing and more particularly to inkjet printing of wide format substrates such as textiles, and to inks and inks sets suitable for use in such printing, wherein ink set including a first magenta ink; a second magnetic ink; a first cyan ink; a second cyan ink; a yellow ink; an orange ink; a green ink; and black ink.

19 Claims, 1 Drawing Sheet

Figure 1

INK JET PRINTING

CROSS-REFERENCE TO RELATED APPLICATION

This application is a divisional of application Ser. No. 10/264,859, filed Oct. 4, 2002, now allowed, now U.S. Pat. No. 6,742,869 which claims priority under 35 U.S.C. §119 from U.S. Provisional Application Ser. No. 60/327,119 (filed Oct. 4, 2001, which is incorporated by reference herein as if fully set forth.

FIELD OF THE INVENTION

This invention pertains to ink jet printing and more particularly to ink jet printing of wide format substrates such as textiles.

BACKGROUND OF THE INVENTION

The printing of textiles is currently accomplished primarily by rotary screen methods. In operation, screen printing is rapid and, for large runs, cost effective. However, cutting screens is expensive and time consuming thus making the per unit cost for short runs and strike-offs quite substantial and, in many cases, prohibitive.

A digital printing method such as ink jet printing offers a number of potential benefits over conventional screen printing methods. Digital printing eliminates the set up expense associated with screen preparation and can potentially enable cost effective short run production.

Ink jet printing furthermore allows visual effects such as tonal gradients and infinite pattern repeat size which can not be practically achieved by a screen printing process.

A disadvantage of ink jet printing, as it exists today, is relatively slow print speed. Current ink jet printers print at a rate of about 1–10 m$^2$/hr max compared to a rate of greater than 1000 m$^2$/hr for screen printing. To be competitive even for short runs, therefore, the speed of ink jet printers needs to be increased.

Another current disadvantage of ink jet printing is the limited amount of colorant and other solids an ink jet ink can contain. Ink jet printing cannot deliver the balance of vivid color as well as end use performance (durability) expected for production quality prints, particularly with pigmented inks. Also, pretreatment of textile fabrics has been required to get good color thus adding an additional step and cost to the manufacturing process. Prints on pretreated fabric may be more susceptible to pigment removal by abrasion and thus have reduced durability and wash fastness.

Yet another current disadvantage of ink jet printing is the limited number of inks which can be practically used on an ink jet printer at any one time. Screen printing can employ twenty or more (typically 10–13) mother colors which can provide a very wide gamut. Ink jet printers have traditionally been limited to no more than about six colors. Ink jet ink colors must thus be chosen judiciously in order to achieve a gamut similar to that of screen printing.

SUMMARY OF THE INVENTION

It is an objective of this invention to provide an ink jet printing system adapted for high speed printing of textiles.

A further objective of this invention is to provide inks which are formulated to deliver both high color expression and good durability on untreated fabrics as well as a broad gamut with a limited number of colorants.

A further objective of this invention is to provide a system which can optimally predict and control ink jet printer output to obtain the desired image quality.

Thus, there is provided a system for printing an image on a wide format recording medium (such as a textile) with an ink jet printer, wherein said system can simulate screen printing, comprising a computer interconnected to an ink jet printer, said ink jet printer being adapted for the printing of said wide format medium, preferably with an aqueous ink jet ink, and more preferably with a pigmented aqueous ink jet ink, wherein said computer is programmed to:

(1) accept a data input constituting said image in a plurality of acceptable file formats, at least one of said acceptable file formats being an indexed RGB file format, and at least another of said acceptable file formats being a monochromatic image format;

(2) transform said data input from said acceptable file format into a suitable L*a*b* file format;

(3) convert said suitable L*a*b file format into a driver format which can drive said ink jet printer to print said image on said wide format recording medium; and (4) communicate said driver format to said printer. Said computer can optionally also be programmed to limit the color gamut of said image in said L*a*b file format to fall within an estimated screen gamut of said screen printer, by mapping said color gamut of said image in said L*a*b file format against said estimated screen gamut of said screen printer so that said color gamut is limited to said estimated screen gamut. The color gamut limited L*a*b file format is then converted into a driver format in step (3) above.

There is also provided a system for printing an image on a wide format recording medium (such as a textile) with an ink jet printer, wherein said system can simulate screen printing, comprising a computer interconnected to an ink jet printer, said ink jet printer being adapted for the printing of said wide format medium, preferably with an aqueous ink jet ink, and more preferably with a pigmented aqueous ink jet ink, wherein said computer is programmed to:

(1) accept a data input constituting said image in an acceptable file format selected from the group consisting of an indexed RGB file format and a monochromatic image format;

(2) transform said data input from said acceptable file format into a suitable L*a*b* file format;

(3) map said color gamut of said image in said L*a*b file format against an estimated screen gamut of said screen printer so that said color gamut is limited to said estimated screen gamut;

(4) convert said color gamut limited L*a*b file format into a driver format which can drive said ink jet printer to print said image on said wide format recording medium; and (5) communicate said driver format to said printer.

In another aspect of the present invention, there is provided a method for printing an image on a wide format recording medium (such as a textile) with a system comprising a computer interconnected to an ink jet printer, adapted for the printing of said wide format medium, preferably with an aqueous ink jet ink, and more preferably with a pigmented aqueous ink jet ink, comprising the steps of:

(1) accepting into said computer a data input constituting said image in a plurality of acceptable file formats, at least one of said acceptable file formats being an indexed RGB file format, and at least another of said acceptable file formats being a monochromatic image format;

(2) transforming in said computer said data input from said acceptable file format into a suitable L*a*b* file format;

(3) converting in said computer said suitable L*a*b file format into a driver format which can drive said ink jet printer to print said image on said wide format recording medium; and (4) communicating said driver format to said ink jet printer to drive said ink jet printer to print said image on said wide format recording medium.

Optionally, the color gamut of said image in said L*a*b file format can be limited to fall within an estimated screen gamut of said screen printer, by mapping said color gamut of said image in said L*a*b file format against said estimated screen gamut of said screen printer so that said color gamut is limited to said estimated screen gamut. The color gamut limited L*a*b file format is then converted into a driver format in step (3) above.

There is also provided a method printing an image on a wide format recording medium (such as a textile) with a system comprising a computer interconnected to an ink jet printer, adapted for the printing of said wide format medium, preferably with an aqueous ink jet ink, and more preferably with a pigmented aqueous ink jet ink, comprising the steps of:

(1) accepting into said computer a data input constituting said image in a plurality of acceptable file formats, at least one of said acceptable file formats being an indexed RGB file format, and at least another of said acceptable file formats being a monochromatic image format;

(2) transforming in said computer said data input from said acceptable file format into a suitable L*a*b* file format;

(3) mapping in said computer said color gamut of said image in said L*a*b file format against an estimated screen gamut of said screen printer so that said color gamut is limited to said estimated screen gamut;

(4) converting in said computer said color gamut limited L*a*b file format into a driver format which can drive said ink jet printer to print said image on said wide format recording medium; and (5) communicating said driver format to said ink jet printer to drive said ink jet printer to print said image on said wide format recording medium.

Another aspect of the present invention relates to a method of limiting the color gamut of an image in data form to an estimated screen gamut of a screen printer, comprising the steps of:

(1) estimating the screen gamut of a screen printer to produce said estimated screen gamut;

(2) mapping said color gamut of said image against said estimated screen gamut to identify one or more colors of said color gamut that fall outside of said estimated screen gamut; and (3) reassigning said identified one or more colors in said color gamut to a color within said estimated screen gamut to produce a gamut limited color gamut.

As indicated above, one preference in the above methods is to use a pigmented aqueous ink jet ink. Another aspect of the present invention is a particular new type of aqueous ink jet ink that has, for example, been found particularly suitable for the printing of textile substrates, said ink comprising an aqueous medium, a pigment as a colorant, and a polymer binder, wherein:

said ink has a viscosity of 10–30 cps at 25° C., said polymer binder comprises one or more dispersed polymers, the binder to pigment weight ratio is greater than about 2, and the total of binder plus pigment is at least about 15% by weight of the ink.

Said inks are advantageous in, for example, providing good crock fastness.

For good color gamut, vivid color and high durability of the printed image with a limited number of colorants, yet another aspect of the present invention provides an ink jet color set of eight inks comprising:

(a) a first magenta ink comprising a quinacridone pigment, preferably PR 122, and carrier;

(b) a second magenta ink, referred to as medium magenta, comprising a quinacridone pigment and carrier, wherein the pigment is the same pigment as in the first magenta ink but is present as a weight percent in an amount from about 5–90% (preferably 5–50%) of that of the first magenta ink;

(c) a first cyan ink comprising a copper phthalocyanine blue pigment, preferably PB 15:3, and carrier;

(d) a second cyan ink, referred to as medium cyan, comprising copper phthalocyanine blue pigment and carrier, wherein the pigment is the same pigment as in the first cyan ink but present as a weight percent in an amount from about 5–90% (preferably about 5–50%) of that of the first cyan ink;

(e) a yellow ink comprising a diarylide yellow pigment, preferably PY 14, and carrier;

(f) an orange ink comprising a diarylide orange pigment, preferably PO 34, and carrier;

(g) a green ink comprising a copper phthalocyanine green pigment, preferably PG 36, and carrier, and (h) a black ink comprising a carbon black pigment and carrier.

The inks are preferably aqueous ink jet inks, and more preferably aqueous ink jet inks having the characteristics mentioned above.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention which are, for brevity, described in the context of a single embodiment, may also be provided separately or in any subcombination.

DETAILED DESCRIPTION OF THE PREFERRED EMBODIMENTS

The present ink jet system comprises, individually and in combination, the software, hardware, inks and media needed to accomplish the printing of the desired image onto wide format media, such as textiles, that are currently printed via rotary screen processes. This system is particularly advantageous for printing short runs, for example, when a new design is being tested. In view of the current relatively slow state of ink jet presenting, large runs of the design for bulk sales would still likely be printed by traditional screen printing, so it is important to make sure the color of the ink jet short run can be accurately reproduced by the rotary screen large run. This correspondence of color is what is meant by the ink jet system simulating screen printing. In other words, the appearance of the output of the ink jet printer should represent as closely as possibly the appearance of the output of screen printing.

It should be noted that the term "computer" as used herein should, unless otherwise stated, be considered in a broad context. As non-limiting examples, the computer can be a single stand alone workstation programmed with software to handle all of the above tasks, or a plurality of computers appropriately programmed and networked to handle all of the above tasks. The computer can, for example, be a stand alone unit appropriately connected to printer hardware, can be integrated into the printer hardware, or any combination of the above. The computer can, for example, be a unit dedicated to the printer system, or can be a multitasking server networking individual workstations to the printer. Any number of other possibilities and/or configurations can be determined by those of ordinary skill in the art based on the specific computer/printer hardware and software, and use environment.

An important part of the ink jet system is the mapping of the image gamut to the gamut of a screen printer in order to limit the colors of the image to only those which lie within the estimated gamut of the rotary printer. To perform this operation, the gamut of each must be expressed in a manner which is device independent, such as L*a*b* space.

Another important part of the ink jet printing system is to transform input image files, which can be presented in a plurality of formats, into suitable computer file format. By "suitable L*a*b* format" it is meant a file format that specifies two-dimensional raster data and the accompanying specification of color for each of the picture elements in the raster data. Attributes of the data include pixel counts in each of the two dimensions, intended physical size in each of the two dimensions, pixel spatial resolution, pixel bit depth and correlation with a color specification model, specification of a color space model, parameters associated with data compression schemes, and parameters that identify the file format.

Preferably the suitable computer file format is L*a*b* TIFF. Computer Aided Design (CAD) stations that are used to capture and/or create images for textile printing tend to store images in file which are other than suitable L*a*b* formats. So another aspect of the present invention is a means for reading images in one or more other file formats and transforming them into L*a*b* TIFF. Preferably, the system can read a plurality of such other file formats and transform those file formats into a suitable L*a*b* format.

CAD image files most relevantly fall into two general categories: indexed RGB and monocromatic images prepared for screen engraving. These and other image files can be transformed into suitable L*a*b* file formats via the implementation of software that can read and rewrite file formats of the sort generated by these CAD systems. Such software is either readily commercially available or can be readily generated by those of ordinary skill in the art from a knowledge of the structure of such other file formats.

For example, indexed RGB files are structured with two distinct sections of data. The color table is a list of R, G & B color values with an identifying index value. The image data does not contain the actual color value, but a reference back to the index in the color table. Each index color is assigned L*a*b* values. Following the color assignment, the resultant file can be saved in a suitable L*a*b* format, such as L*a*b* TIFF format, for further processing. Current versions of TIFF do not provide for indexed L*a*b* TIFF format support, so files are written in a non-indexed (3 color values per pixel) manner.

The monocromatic images prepared for screen engraving can be, for example, flat separated files or grayscale tonal files.

Flat separated files are image files that have previously been prepared for direct screen engraving. They contain single bit data per pixel. Each pixel (assigned a 1 or 0) corresponds to the allowance or inhibiting of ink to flow through the screen. Normally one file is assigned per color, with a collection of files making up the final image. Color values can be assigned to these previous black and white only images to facilitate digital color rendition of the rotary screen printing. Following the assignment of color values (either RGB or L*a*b*) to each separation plane, the user has the ability to further process the files as single-plane color. In single-plane color file, the system looks for pixel collisions. A pixel collision is where color information exists in the identical physical location on multiple color planes. This is analogous to applying two ink colors in the printing process. Examples of how to handle color calculations of pixel collisions are provided hereinafter, and are referred to as "fall-on" predictions.

Greyscale tonal is similar to a flat separated file with the image data not containing color information. Whereas a flat separated file contains a single bit of data per pixel (1 or 0 values), the Greyscale tonal file contains one byte per pixel (0 to 255) representing a percentage of ink to be applied from 1% to 100%. As in the flat separated file, a user assigns colors to each color plane. This assignment can only occur at the solid ink value (255 value), since any lower value is merely a lesser amount of ink applied per pixel area. For example, a pixel value of 128 represents about 50% of pixel value 255 and therefore only half of the ink applied to the solid will be applied to the 128 value pixel. This presents a challenge when applying L*a*b* color values to non-solid (i.e. tonal) pixels. When an L*a*b* color value is assigned to this color plane, the system needs to calculate a unique percentage of L*a*b* for each value from 0 to 255. The initial assignment to the solid (v=255) is made by the user. If no more calculations were performed, the balance of the file would remain without a color assignment. The system must now recalculate the L*a*b* values for each of the non-255 (solid) values, producing a resultant file. Now each pixel value contains L*a*b* information. This process is repeated for each color assignment for each separation. When the user elects to save the file the pixel collisions (for fall-ons or overlapping) must be calculated for any combination of pixels that contain color (non-zero) information. This is done in a similar fashion as discussed in separated flat. Again, examples of how to handle color calculations of pixel collisions ("fall-on" predictions) are provided hereinafter.

Another aspect of the present invention is a determination of the gamut of the screen printer to be simulated. Direct measurement of the gamut could be used, but this could involve producing thousands of mother ink mixtures and measuring the color of each on the particular substrate of interest. A preferred method involves estimating the gamut by characterizing the set of mother inks and substrates followed by computer modeling of the optical behavior of said inks on those substrates (estimated screen gamut). The use of computer models allows for color predictions of thousands of potential ink mixtures. These computer models may make use of well known mathematical relations such as the Kubelka-Munk equations for color prediction, which are described in well known textbooks such as *Principles of Color Technology*, Billmeyer and Saltzman, 3ed. by Roy Berns (2000). Estimating the optical constants includes empirically fitting the measured variables with, for example, a cubic spline fit to estimate the dependence on ink concentration. These estimated constants can then be used in computer models that relate the amount of said inks in a mixture to the resulting colors. These computer models need to be created in a way that results in efficient calculation time and where the calculated mixtures are designed in such a way to generate ink mixtures whose resulting colors lie as closely as possible to the gamut shell of the system. This can be achieved, for example, by limiting mixtures to two components in a nearest neighbor or nearest neighbor plus 1 approach. Limiting the considered mixtures in this way results in colors with the maximum chroma, and most efficient calculating speed. Additionally, one could apply constraints to the mixtures so as not to exceed anticipated process limits. The tabulated colors expressed as CIELab values constitute a description of the screen gamut. Further computer processing will map a population of a very large sampling of colors to the limits of this shell. The results of this mapping procedure can be utilized as an abstract profile in an ICC compliant workflow.

Having the image and the estimated screen gamut both expressed in L*a*b* format, a comparison of the two can be made, and where the image calls for a color which is outside the estimated screen gamut, that color is reassigned to the nearest appropriate color within the screen gamut. After this, the image is now referred to as the gamut limited image.

The gamut limited image data is then converted into a format with can be used by a printer driver, which driver then causes the image to be printed on an ink jet printer. Methods for conversion of the images into driver useable format, the drivers and the driving of ink jet printers is all well known and any such suitable technology could be incorporated into the ink jet system of the present invention.

The Ink Jet Printer System

Figure 1:
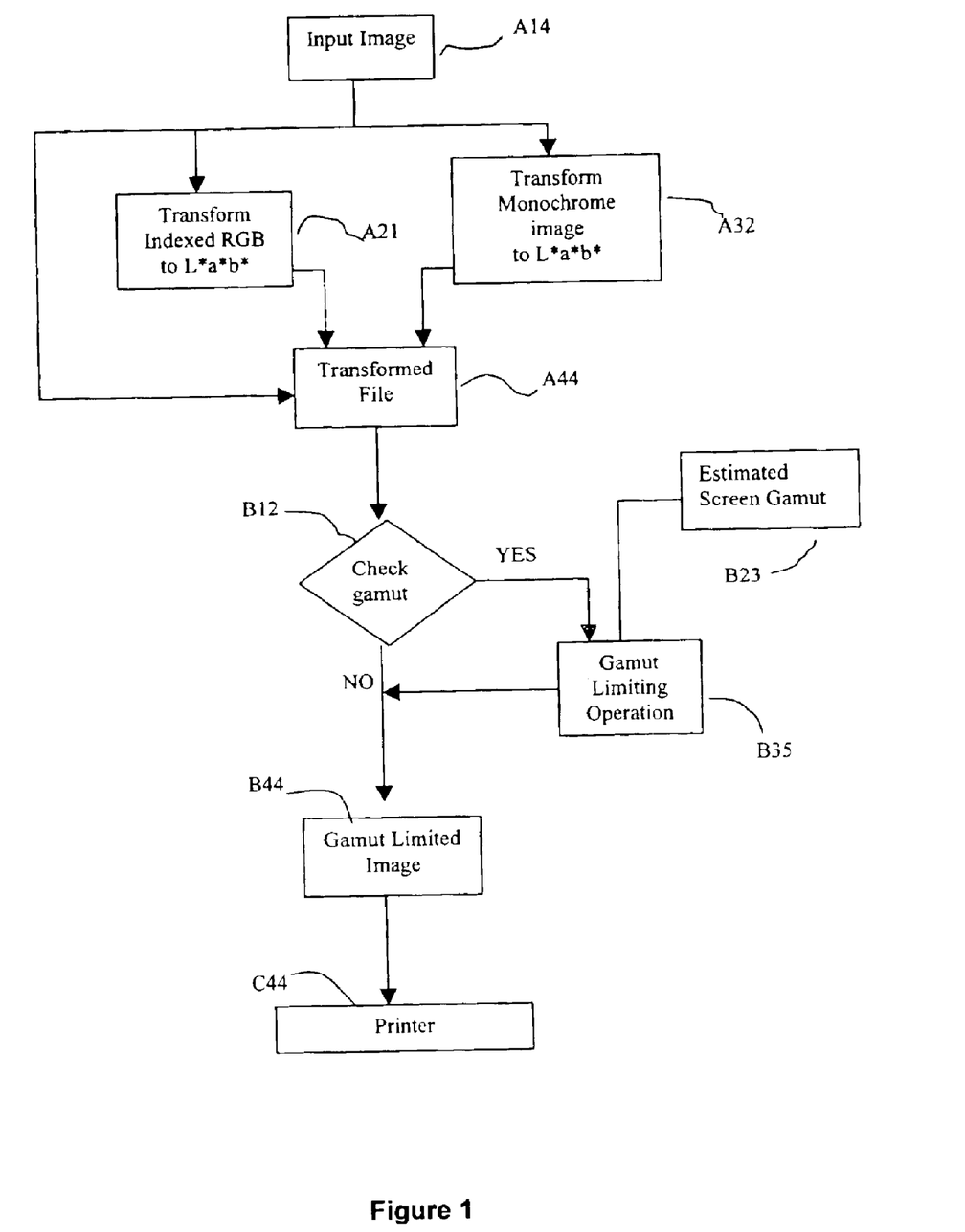
FIG. 1 is a block diagram of an ink jet textile printing system in accordance with a preferred embodiment the present invention.

FIG. 1 depicts a block diagram of a preferred embodiment of the instant printing system. The desired design image is input in A14 as part of the image transforming means, which means can be a computer workstation. The input image can be in a plurality of formats. Indexed RGB and monochrome images, for example, are transformed (rewritten) into an L*a*b* format as depicted by A21 and A32. The output is a composite image in suitable L*a*b* format, depicted by A44. A pathway from A14 to A44 indicates an input file which is already in suitable L*a*b* format as received.

An image from A44 can optionally at B12 be sent through a gamut limiting operation B35. The image from A44 is mapped against an estimated screen gamut B23 of a screen printer, and the gamut of the image is limited to fall within the estimated screen gamut. The output of the gamut limiting operation B35, whether optionally subjected to the gamut limiting operation or not, is referred to as a gamut limited image B44.

The gamut limited image is then printed on the ink jet printer C44.

Ink Jet Printer

The ink jet printer can be any suitable printer capable of media that is typically used in screen printing operations, such as textiles. The preferred printer is adapted for the printing of textiles.

One preferred printer is an adapted Vutek model 2360 printer (Vutek Inc., Meredith, N.H. USA). Required adaptations of such printer include widening from 2 to 3 meters, modifying the ink handling system to handle the eight colors of the instant ink set, and further modifying the ink handling system and printheads to utilize aqueous pigmented ink jet inks. Preferred printheads are drop-on-demand piezo printheads.

The software to drive the printer can be the same as that used to drive the current Vutek model 2360 printer, namely Kodak Color Management System, Colorburst RIP and UltraVu driver.

The printer can also be equipped with a heater for the printed textile, or a separate heater can be added in-line after the printer, as it has been found that the durability of textile prints, for example prints made by the instant printer system with the instant inks, can be improved by heat treating the prints. Heating may be done in any sort of heated environment including convection, forced air, circulating or vacuum ovens. Temperatures may range from about 50° C. to about 200° C., preferably from about 120° C. to 185° C. The time of exposure of the prints to such temperature may be between about 10 seconds and about 30 minutes at temperatures which exceed 120° C., or between about 30 minutes and about 4 hours at temperatures below 120° C., so long as care is taken to choose a temperature and time setting that does not burn or discolor, or damage in any manner the fabric the prints were made.

Textiles

Textiles useful in this invention include, but are not limited cotton, wool, silk, nylon, polyester and the like. The finished form of the textile includes, but is not limited to, fabrics, non-woven webs, garments, furnishings such as carpets and upholstery fabrics, and the like.

Ink Jet Ink

The ink jet ink preferably comprises an aqueous vehicle and a particulate colorant. The ink may also contain other additives known in the art.

Aqueous vehicle: The aqueous vehicle is water or a mixture of water and at least one water-soluble organic solvent. Selection of a suitable mixture depends on requirements of the specific application, such as desired surface tension and viscosity, the selected colorant, drying time of the ink, and the type of substrate onto which the ink will be printed. Representative examples of water-soluble organic solvents that may be selected are disclosed in U.S. Pat. No. 5,085,698 (incorporated by reference herein for all purposes as if fully set forth).

If a mixture of water and a water-soluble solvent is used, the aqueous vehicle typically will contain about 30% to about 95% water with the balance (i.e., about 70% to about 5%) being the water-soluble solvent. Preferred compositions contain about 60% to about 95% water, based on the total weight of the aqueous vehicle.

The amount of aqueous vehicle in the ink is in the range of about 70% to about 99.8%, preferably about 80% to about 99.8%, based on total weight of the ink when an organic pigment is selected, and about 25% to about 99.8%, preferably about 70% to about 99.8% when an inorganic pigment is selected.

Particulate Colorant: The colorant is either a disperse dye or a pigment that is insoluble in the aqueous vehicle. By "pigment" we mean a colorant that is insoluble (i.e., in particulate or crystalline form) throughout the printing process. "Dispersed dyes" are colorants that, while insoluble in the aqueous vehicle, become soluble at some point in the printing process. Pigments are the preferred colorants for use in the ink compositions of this invention.

Pigments: Useful pigments comprise a wide variety of organic and inorganic pigments, alone or in combination. The pigment particles are sufficiently small to permit free flow of the ink through the ink jet printing device, especially at the ejecting nozzles that usually have a diameter ranging from about 10 microns to about 50 microns. The particle size also has an influence on the pigment dispersion stability, which is critical throughout the life of the ink. Brownian motion of minute particles will help prevent the particles from settling. It is also desirable to use small particles for maximum color strength. The range of useful particle size is about 0.005 micron to about 15 microns, preferably about 0.005 to about 5 microns, and most preferably from about 0.01 to about 0.3 micron. Representative commercial dry and presscake pigments that may be used in practicing the invention are disclosed in previously incorporated U.S. Pat. No. 5,085,698.

In the case of organic pigments, the ink may contain up to about 30% pigment by weight, but will generally be in the range of about 0.5% to about 15%, preferably about 0.6% to about 8%, by weight of the total ink composition for most ink jet printing applications. If an inorganic pigment is selected, the ink will tend to contain higher weight percentages of the pigment than with comparable inks employing organic pigment, and may be as high as about 70%, because inorganic pigments generally have a higher specific gravity.

Dispersant (Binder): The dispersant is preferably a polymeric dispersant. Either structured or random polymers may be used, although structured polymers are preferred for use as dispersants for reasons well known in the art. The term "structured polymer" means polymers having a block, branched or graft structure. Particularly preferred structured polymers are AB or BAB block copolymers disclosed in previously incorporated U.S. Pat. No. 5,085,698; ABC block copolymers disclosed in U.S. Pat. No. 5,519,085; and graft polymers disclosed in U.S. Pat. No. 5,231,131. The disclosures of the latter two references are also incorporated by reference herein for all purposes as if fully set forth.

Polymer dispersants suitable for use in the present invention comprise both hydrophobic and hydrophilic monomers. Some examples of hydrophobic monomers used in random polymers are methyl methacrylate, n-butyl methacrylate, 2-ethylhexyl methacrylate, benzyl methacrylate, 2-phenylethyl methacrylate and the corresponding acrylates. Examples of hydrophilic monomers are methacrylic acid, acrylic acid, dimethylaminoethyl(meth)acrylate and salts thereof. Also quaternary salts of dimethylaminoethyl(meth)acrylate may be employed.

The number average molecular weight of the polymer should be less than about 50,000 Daltons, preferably less than about 10,000 and most preferably less than about 6,000. Polymers having a polydispersity (the relationship between number average molecular weight and weight average molecular weight) between about 1–4, most preferably between about 1–2, are most advantageous.

Other Ingredients: The ink jet ink may contain other ingredients as are well known in the art. For example, anionic, nonionic, or amphoteric surfactants may be used. Cationic surfactants may also be used as long as careful consideration is given to compatibility with the other ink components. In aqueous inks, the surfactants are typically present in the amount of about 0.01–5% and preferably about 0.2–2%, based on the total weight of the ink.

Cosolvents, such as those exemplified in U.S. Pat. No. 5,272,201 (incorporated by reference herein for all purposes as if fully set forth) may be included to improve pluggage inhibition properties of the ink composition.

Biocides may be used to inhibit growth of microorganisms.

Sequestering agents such as EDTA may also be included to eliminate deleterious effects of heavy metal impurities.

Other known additives may also be added to improve various properties of the ink compositions as desired.

Ink Properties: Jet velocity, separation length of the droplets, drop size and stream stability are greatly affected by the surface tension and the viscosity of the ink. Pigmented ink jet inks suitable for use with ink jet printing systems should have a surface tension in the range of about 20 dyne/cm to about 70 dyne/cm at 25° C. Viscosity is preferably in the range of about 10 cP to about 30 cP at 25° C. The ink has physical properties compatible with a wide range of ejecting conditions, i.e., driving frequency of the piezo element for either a drop-on-demand device or a continuous device, and the shape and size of the nozzle. The inks should have excellent storage stability for long periods so as not clog to a significant extent in an ink jet apparatus. Further, the ink should not corrode parts of the ink jet printing device it comes in contact with, and it should be essentially odorless and non-toxic.

In Jet Color Set

The colorants of the instant invention, as generally described above, provide a particularly useful ink jet color set for simulating the gamut of typical screen printers. It is not simply the total volume of color space covered but, more particularly, the degree of overlap of volume of the screen printing gamut. The addition of a lighter magenta and a lighter cyan provides good reproduction of color in the interior of the gamut ("inside" gamut) as well as the outer edges ("outside" gamut).

The preferred colorants are not only the specific pigments mentioned in the ink examples hereinafter, but also the class of pigment from which they are derived. Thus, the colorants of the instant color set comprise a quinacridone magenta pigment, a copper phthalocyanine blue (cyan) pigment, a diarylide yellow pigment, diarylide orange pigment, a copper phthalocyanine green pigment, a carbon black pigment and carrier. In addition to six full strength inks with these colorants, there is also a lighter magenta and lighter cyan ink which comprises those magenta and cyan colorants at lower levels. The set then comprises eight inks, commonly symbolized as CcMmYKOG.

The advantages of the instant ink set can be achieved through formulation with any suitable vehicle, not just the those vehicles disclosed herein. The vehicle and any dispersants for the instant colorant set is not limited in any way. The colorant set is also understood to include the situation where any, or all, members of the set have undergone pigment surface modification so as to become self dispersing.

Fall-On Prediction for Six-Color Digital Printer (1) Make printer profile: create the characterization target image; print the target image; measure the printed target in CIELab value; input value to create a printer profile.

(2) Get model parameters: create test patterns for deriving parameters; print the pattern image; measure the printed image in density; initialize the Proportional Add (PA) model; run an optimization routine to determine the model parameter for PA.

(3) Get Color-Component-Replacement (CCR) table: abstract from the forward LUT of the printer profile to create a set of 1-D forward LUTs for Black, Orange and Green; find the CMY color that matches the single K, O or G color by adjusting the input CMY values to the printer model which contains a forward LUT of the printer profile and an interpolator, such that the output of the model is these 1-D forward LUTs (this process is controlled by an optimization process); the CMY values found above replace the output values of the 1-D LUTs to form a set of CCR tables.

(4) Build PA model: the PA model is formulated for each ink color (C, M, Y, K, O or G) as:

$$A_{new} = C_1 * \left( \sum_{i=1}^{N} A_i \right) - C_2 * \left( 0.5 * \sum_{i \neq j}^{N} A_i * A_j \right) + C_3 * \left( 1/6 * \sum_{i \neq j \neq k}^{N} A_i * A_j * A_k \right)$$

wherein $A_{new}$ is the prediction of the fall-on color for each ink color (C, M, Y, K, O or G) in the range of 0 to 1 (needs to be scaled to 0 to 255 as the prediction in the unite of digital count); $C_1$, $C_2$ and $C_3$ are constants determined in the process 3 (Get model parameters); $A_i$ is the digital count (0–255) scaled to the range of (0–1) with the subscript "i" denoted the $i^{th}$ overlap color and i runs from 1 to N where N is the total number of overlap colors.

(5) Build CCR model: if all color components are in the range of 0 to 255, exit the model. For "primary" color component (C, M or Y) that exceeds 255, find the grey component and replace the grey component with K using the grey component model which contains a LUT created from process 4 (Get Color-Component-Replacement table) and an interpolator. If one of the primary components is still exceeds 255 after grey component replacement, determine whether the excess component constitutes either an Orange component or a Green component. If it constitutes an Orange component, replace it with O using the orange component model which contains a LUT created from step (4) above and an interpolator. If it constitutes a Green component, replace it with G using the green component model which contains a LUT created from step (4) above and an interpolator. If one of the primary components still exceeds 255 after grey and color component replacement, truncate it to 255. For "non-primary" color component (O, G or K) that exceeds 255, replace it with primary component when appropriate, otherwise truncate it to 255.

(6) Build the Fall-On-Prediction model (FOP): The FOP consists of an inverse printer model which contains an inverse LUT (Lab to CMYKOG) of the printer profile and an interpolator, a PA model, a CCR model, a forward printer model which contains an forward LUT (CMYKOG to Lab) of the printer profile and an interpolator. The process of fall-on prediction comprises: N overlap colors (in Lab values) are input to the inverse printer model N time; The N overlap colors in CMYKOG space output from the inverse printer model are together sent to the PA model; N overlap colors of each ink color (C, M, Y, K, O or G) is processed by PA separately (process six times in total). The combined value of the N overlap colors for each ink color produced by PA (a CMYKOG value) are sent together to the CCR model; The modified CMYKOG value from CCR model is input to the forward printer model; the output of the forward printer model is the predicted Lab value for the overlap color.

EXAMPLES

Example 1

Ink Jet Inks for Textile

Preparation of Macromonomer for Dispersant 1

The macromonomer ethoxytriethyleneglycol methacrylate-co-methacrylic acid, 15.0/85.0 by weight was prepared using the following procedure:

A mixture of isopropanol (530.5 gm), acetone (77.5 gm), methacrylic acid (70.1 gm) and ethoxytriethyleneglycol methacrylate (12.4 gm) was charged into a 3 liter flask equipped with a thermometer, stirrer, additional funnels, reflux condenser and a means of maintaining a nitrogen blanket over the reactants. The mixture was heated to reflux temperature and refluxed for about 20 minutes. Then a solution of diaquabis(borondifluorodiphenyl glyoximato) cobalt (II), CO(DPG-BF2) (0.1035 gm), 2,2'-azobis (methylbutyronitrile), (Vazo™ 67, by E.I. du Pont de Nemours and Company, Wilmington, Del.) (0.78 gm) and acetone (21.5 gm) was added. Subsequently, two solutions, the first composed of methacrylic acid (280.1 gm) and ethoxytriethyleneglycol methacrylate (49.4 gm) and the second composed of Co(DPG-BF2) (0.1035 gm), Vazo™ 67 (4.5 gm) and acetone (47.5 gm) were simultaneously added while the reaction mixture was held at reflux temperature at about 72° C. The addition of the first solution was completed in 4 hours and the addition of the second solution was completed in 90 minutes. When the addition of second solution was completed, the addition of a new solution comprised of Co(DPG-BF2), (0.041 gm), Vazo™ 52 (2.30 gm) and acetone (40.5 gm) was begun and was completed in 75 minutes.

A final solution comprising Co(DPG-BF2) (0.062 gm), Vazo™ 52 (2.30 gm) and acetone (40.5 gm) was added over a period of 75 minutes while the reaction mixture was held at reflux temperature throughout the course of addition. Reflux was continued for another hour and the solution was cooled to room temperature.

The resulting macromonomer solution was a clear thin polymer solution and had a solids content of about 34.8%. The macromonomer contained 15% of ethoxytriethyleneglycol methacrylate and 85% of methacrylic acid (by weight) and had a weight average molecular weight of 3,330 and a number average molecular weight of 1,980 as measured by Gel Permeation Chromatography (GPC) on a methylated macromonomer sample using polymethyl methacrylate as the standard.

Preparation of Dispersant 1

This demonstrates the preparation of a graft copolymer, phenoxyethyl acrylate-g-ethoxy-triethyleneglycol methacrylate-co-methacrylic acid, 61.6/5.8/32.6% by weight, from the macromonomer herein before described.

A mixture of macromonomer (114.9 gm) and 2-pyrrolidone (20.0 gm) was charged into a 500 mL flask equipped with a thermometer, stirrer, additional funnels, reflux condenser and a means of maintaining a nitrogen blanket over the reaction mixture. The mixture was heated to reflux temperature and refluxed for about 10 minutes. A solution containing t-butyl peroxypivalate (Lupersol™ 11, Elf Atochem, Philadelphia, Pa.) (0.67 gm) and acetone (10.0 gm) was added. Subsequently, two solutions, the first comprised of phenoxyethyl acrylate (64.2 gm) and 2-pyrrolidone (20.0 gm), and the second comprised of Lupersol™ 11 (2.67 gm) and acetone (20.0 gm), were simultaneously added, over 3 hours, to the reactor while the reaction mixture was held at reflux temperature, at about 70–71° C. Following this addition the reaction mixture was refluxed an additional hour. The final solution being comprised of Lupersol™ 11 (0.67 gm) and acetone (20.0 gm) was then added in a single shot. The reaction mixture was refluxed at about 65° C. for an additional 2 hours. The mixture was distilled until about 99.8 g of the volatiles were collected. Then, 105.0 g of 2-pyrrolidone was added to yield 238.0 g of a 43.3% polymer solution.

The graft copolymer had a weight average molecular weight of 18,800 and a number average molecular weight of 8,810 as measured by Gel Permeation Chromatography (GPC) on a methylated sample using polymethyl methacrylate as the standard.

Preparation of Dispersant 2

A block copolymer BzMA/MAA 13/10 was prepared using the following procedure:

A 3-liter flask was equipped with a mechanical stirrer, thermometer, N2 inlet, drying tube outlet, and addition funnels. Tetrahydrofuran (THF) (780 gm) and p-xylene (3.6 gm) were charged to the flask. The catalyst, tetrabutyl ammonium m-chlorobenzoate (7.0 ml of 1.0 M solution in acetonitrile), was then added. Initiator (1,1-bis(trimethylsiloxy)-2-methyl propene) (73.0 gm; 0.315 M) was injected. A solution comprising catalyst (7.0 ml of a 1.0 M solution in acetonitrile) was added over 150 minutes. A second solution, comprising trimethylsilyl methacrylate (450.0 gm; 2.85 M) was started at the same time and added over 50 minutes. Eighty minutes after its completion (over 99% of the monomers had reacted), benzyl methacrylate (723.0 gm; 4.11 M) was started and added over 30 minutes. After 180 minutes, dry methanol (216 gm) was added to the above solution and distillation was begun. During the first stage of distillation, 210.0 gm of material, with a boiling point of below 55° C., was removed from the flask. Distillation continued. During the second stage the boiling point increased to 76° C. i-Propanol, (200 gm), 2-pyrrolidone (1475 gm) and water (250 gm) were added and distillation continued until a total of 1609 g of solvent had been removed. This made a BzMA/MAA 13/10 polymer at 40.0% solids.

Preparation of Dispersant 3

A block copolymer BzMA/MAA/ETEGMA 13/13/7.5, was prepared using the following procedure:

A 5-liter flask was equipped with a mechanical stirrer, thermometer, N2 inlet, drying tube outlet, and addition funnels. Tetrahydrofuran (THF) (939.58 gm), was charged to the flask. The catalyst, tetrabutyl ammonium m-chlorobenzoate, (7.0 ml of 1.0 M solution in acetonitrile) was then added. Initiator (1,1-bis(trimethylsiloxy)-2-methyl propene) (60.0 g, 0.257M) was injected. A solution comprising catalyst (7.0 ml of a 1.0 M solution in acetonitrile) was added over 150 minutes. A second solution comprising a mixture of trimethylsilyl methacrylate (488.24 g, 3.08M) and ethoxytriethyleneglycol methacrylate (437.39 g; 1.78M) was started at the same time and added over 50 minutes. Eighty minutes after its completion (over 99% of the monomers had reacted), benzyl methacrylate (542.41 g, 2.20M) was started and added over 30 minutes. After 180 minutes, dry methanol (216 gm) was added to the above solution and distillation was begun. During the first stage of distillation, 210.0 gm of material, with a boiling point of below 55° C., was removed from the flask. Distillation continued. During the second stage the boiling point increased to 76° C. Methanol (165 gm), 2-pyrrolidone (1830 gm) and water (250 gm) were added and distillation continued until about 1300 gms of solvent had been removed. This made a BzMA/MAA/ETEGMA 13/13/7.5 polymer at 40.0% solids.

Preparation of Pigment Dispersions

Black dispersion was prepared according to the following procedure: Mix well the following ingredients: (i) 57.83 parts by weight (pbw) deionized water, (ii) 21.67 pbw of Dispersant 1, and (iii) 2.5 pbw of dimethylethanolamine. Gradually add carbon black pigment (18 pbw). The batch was circulated in the mill for grinding. The ground dispersion was then diluted to 15 wt % pigment for final application in making inks. The 15 wt % dispersion had the following properties: Brookfield viscosity of 12 cps, pH of 7.8, median particle size of 77 nm.

Yellow dispersion was prepared according to the procedure above except yellow pigment PY14 was substituted for the black pigment. The ground dispersion was then diluted to 15 wt % pigment for final application in making inks. The resultant 15 wt % dispersion had the following properties: Brookfield viscosity of 14, pH of 8.0, median particle size of 20 nm.

Green dispersion was prepared according to the procedure for dispersion above except green pigment PG36 was substituted for the yellow black. The ground dispersion was then diluted to 15% pigment for final application in making inks. The resultant 15% dispersion had the following properties: Brookfield viscosity of 11, pH of 7.5, median particle size of 102 nm.

Magenta dispersion was prepared as follows. Dispersant 2 (200 g), magenta pigment PR122 (150 g) and isopropanol (450 g) were mixed and charged to a 2 roll mill and processed for 45 minutes to produce chip. The chip was then dissolved with water (396 g) and dimethylethanol amine (40 g) to produce magenta dispersion containing 15% pigment. The 15% magenta dispersion had the following properties: Brookfield viscosity of 13 cp, pH of 8.0, median particle size of 60 nm.

Cyan pigment dispersion was be prepared according the following procedure: 56.44 pbw deionized water, 23.08 pbw of dispersant 3 (40.0 wt. % active solution) and 2.48 pbw dimethylethanolamine were mixed well. Gradually 18 pbw of the cyan pigment PB15 was added. The batch was circulated to the mill for grinding. The ground dispersion was then diluted to 15 wt % pigment for final application in making inks. The 15 wt % cyan dispersion had the following properties: Brookfield viscosity of 20 cp, pH of 8.1, median particle size of 66 nm.

Orange pigment dispersion was prepared according the procedure herein above except orange pigment PO34 was substituted for the cyan pigment. The ground dispersion was then diluted to 15% pigment for final application in making inks. The resultant 15% dispersion had the following properties: Brookfield viscosity of 40, pH of 7.8, median particle size of 41 nm.

Preparation of Dispersed Binder

A solution prepared from deionized water (1318.0 gm), nonylphenoxy polyethyleneoxy ethyl sulfate (4 moles EO) (5.0 g) and allyl dodecyl sulfosuccinate sodium salt (7.0 gm) was added to a reaction vessel equipped with a heating mantle, stirrer, thermometer, reflux condenser and two addition funnels. The resulting mixture was heated to 85° C. with mixing. A solution comprising deionized water (40.0 g) and ammonium persulfate (4.0 g) was placed in an addition funnel attached to the reactor. A second solution comprised of methyl methacrylate monomer (MMA) (576.0 gm), styrene monomer (Sty) (240.0 gm), 2-ethyl hexyl acrylate monomer (2-EHA) (640.0 gm), N-methylol methacrylamide monomer (MOLMAN) (87.0 gm), methacrylic acid monomer (MAA) (48.0 gm), nonylphenoxy polyethyleneoxy ethyl sulfate (14.0 gm), allyl dodecyl sulfosuccinate sodium salt (20.0 gm) and deionized water (908.0 gm) was emulsified with an Eppenbach homogenizer. This pre-emulsified solution was placed in an addition funnel attached to the reactor. Five percent of the resulting pre-emulsion was added to the reaction vessel and the temperature of the constituents in the vessel was stabilized at 85° C. The ammonium persulfate solution was then added and held for 5 minutes. The remainder of the pre-emulsion was added over a period of 90 min. at a uniform rate. The temperature of the resulting polymerization mixture was maintained at 88–90° C. during the addition. The polymerization mixture was held at this temperature for 1 hour. The polymerization mixture was cooled to 35° C. and neutralized with a solution of deionized water (30.0 gm), aqueous ammonium hydroxide solution (45.0 gm) and (29% aqueous solution) of methanol((((2-dihydro-5-methyl-3(2H)-oxazolyl)-1-methylethoxy)methoxy)methoxy) (4.0 gm) to achieve a pH of 8.5 to 9.0.

The resulting dispersed polymer had the following composition: MMA/S/2-EHA/MOLMAN/HEA/MAA in a weight ratio of 36/15/40/3/3/3. The polymer had a weight average molecular weight of about 500,000–1,250,000. The dispersed polymer average particle size was 0.095 microns and percent weight solids was 35.7%.

Preparation of Resin A

Resin A was prepared as follows: Into a 1 liter flask a solution of deionized water (307.0 gm), Proxel GXL (0.7 gm) and dimethylethanol amine (38.4 gm) was prepared by mixing. A copolymer solution (154.0 gm) of Dispersant 3 at 40% solids in 2-pyrrolidone was then added to the flask over 30 minutes with mixing. The resulting acrylic resin solution had a weight solids of 20.0%.

Preparation of Inks

Following inks were prepared by combining the ingredients as shown below in TABLE 1. The viscosities indicated were measured in a Brookfield Viscometer with LVT adapter, at 25° C.

of the inks shown in the table were measured with a Brookfield Viscometer with LVT adapter, at 25° C.

TABLE 2

|  | Comparative Ink | | |
|---|---|---|---|
|  | A | B | C |
| Cyan Dispersion | 23.3 | — | — |
| Magenta Dispersion | — | 28.3 | — |
| Yellow Dispersion | — | — | 27.3 |
| Aerosol OT | 1.0 | 1.0 | 1.0 |
| Glycerol | 5.0 | 5.0 | 4.8 |
| Liponic EG-1 | 3.5 | 3.5 | 3.3 |
| Dispersed polymer binder | 10.1 | 12.2 | 11.8 |
| 2-Pyrrolidone | 3.5 | 3.5 | 3.3 |
| Proxel GXL | 0.25 | 0.25 | 0.25 |
| Deionized Water | Balance | Balance | Balance |
| Total | 100 | 100 | 100 |
| Viscosity (centipoise) | 3 | 4 | 4 |

Printing and Color Data Comparison Showing Effect of Ink Viscosity

Inks 1, 2 and 3 were printed from a Sectra Nova AQ (Spectra Inc., Hanover, N.H. USA) printer onto cotton (Type 439, from Testfabrics, West Pittston, Pa.) using a printmode of 360 dpi×360 dpi. In this mode, the amount of ink put onto the substrate at 100% ink coverage is approximately 12–14 mL per square meter. Images with different amount of ink coverage ranging from 10% to 100% in increments of 10% were produced on the fabric. The printed fabric was then allowed to dry either at ambient temperatures overnight, or in an oven set at 140–180° C. for 2–30 minutes. The optical density of the printed images was measured using an X-Rite SP64 with D65/10 illuminate using the specular included mode.

Similarly, comparative inks A, B and C were printed from an Epson 3000 printer also onto cotton (Type 439) using a printmode of 720 dpi×720 dpi. In this printing mode, the

TABLE 1

|  | Ink Example | | | | | | | | | | |
|---|---|---|---|---|---|---|---|---|---|---|---|
|  | 1 | 2 | 3 | 4 | 5 | 6 | 7 | 8 | 9 | 10 | 11 |
| Black Dispersion | — | — | — | — | 28.3 | — | — | — | — | — | 28.3 |
| Yellow Dispersion | — | — | 28.3 | — | — | — | — | — | — | — | — |
| Green Dispersion | — | — | — | — | — | — | — | 28.3 | — | 28.3 | — |
| Magenta Dispersion | — | 28.3 | — | 5.7 | — | — | — | — | — | — | — |
| Cyan Dispersion | 21.7 | — | — | — | — | 4 | — | — | — | — | — |
| Orange Dispersion | — | — | — | — | — | — | 28.3 | — | 28.3 | — | — |
| Resin A | — | — | — | 12 | — | 16.3 | — | — | — | — | — |
| DPM | 5 | 5 | 5 | 5 | 5 | 5 | 5 | 5 | 5 | 5 | 5 |
| Dynol 604 | 0.4 | 0.4 | 0.4 | 0.4 | 0.4 | 0.4 | 0.4 | 0.4 | 0.4 | 0.4 | 0.4 |
| Silicone Defoamer | 0–0.3 | 0–0.3 | 0–0.3 | 0–0.3 | 0–0.3 | 0–0.3 | 0–0.3 | 0–0.3 | 0–0.3 | 0–0.3 | 0–0.3 |
| Proxel GXL | 0.25 | 0.25 | 0.25 | 0.25 | 0.25 | 0.25 | 0.25 | 0.25 | 0.25 | 0.25 | 0.25 |
| Dispersed Binder | 46.5 | 42.3 | 42.3 | 42.3 | 42.3 | 45.1 | 39.4 | 46.5 | 39.4 | 46.5 | 42.3 |
| Glycerol | 5.5 | 5.5 | 5.5 | 5 | 5 | 5 | 5.5 | 5.5 | 5.5 | 5.5 | 5.5 |
| Liponic LG-1 | 7.5 | 7.5 | 7.5 | 5 | 5 | 5 | 7.5 | 7.5 | 5 | 5 | 7.5 |
| Deionized Water | bal. | bal. | bal. | Bal. | bal. | bal.. | bal. | bal. | bal. | bal. | bal. |
| Total | 100 | 100 | 100 | 100 | 100 | 100 | 100 | 100 | 100 | 100 | 100 |
| Viscosity (centipoise) | 13 | 15 | 16 | 9 | 11 | 10 | 15 | 16 | 14 | 10 | 16 |

Examples of Silicone defoamer used herein are Surfynol DF-58 and DF-66, both from Air Products, Allentown, Pa.

Preparation of Comparative (Low Viscosity) Inks

Comparative inks A, B and C were prepared by combining the ingredients as shown below in TABLE 2. Viscosity amount of ink put onto the substrate at 100% ink coverage is approximately 12–14 mL per square meter. The optical densities of the printed images were obtained as described above and summarized in TABLE 3 below.

TABLE 3

| Ink Coverage | Optical Density of Printed Image | | | | | |
|---|---|---|---|---|---|---|
| | Cyan Ink Ex. 1 | Mag. Ink Ex. 2 | Yell. Ink Ex. 3 | Cyan Ink Ex. A | Mag. Ink Ex. B | Yell. Ink Ex. C |
| 10% | .62 | .46 | .38 | .27 | .17 | .19 |
| 20% | .85 | .66 | .58 | .43 | .27 | .35 |
| 30% | .97 | .77 | .72 | .58 | .43 | .50 |
| 40% | 1.02 | .83 | .82 | .65 | .49 | .54 |
| 50% | 1.07 | .88 | .89 | .79 | .58 | .64 |
| 60% | 1.11 | .92 | .95 | .86 | .63 | .71 |
| 70% | 1.13 | .96 | .95 | .91 | .73 | .79 |
| 80% | 1.15 | .98 | .98 | .90 | .73 | .82 |
| 90% | 1.20 | 1.02 | 1.02 | .97 | .85 | .83 |
| 100% | 1.23 | 1.05 | 1.03 | 1.02 | .84 | .86 |

The optical density showed that inks of the same pigment type (comparing Ex. 1 with Ex. A; Ex. 2 with Ex. B; and Ex. 3 with Ex. C) gave more color if formulated as a higher viscosity inks. As demonstrated, the maximum color obtained by Inks Ex. A, B and C at 100% ink coverage on the substrate are obtained by Ink Ex. 1,2, and 3 at lower ink coverages of around 40–50% on the same substrate.

Crockfastness—Post Treatment Heating

Crockfastness was determined according to the procedure described by AATCC Test Method 8 (Research Triangle Park, N.C.). A crock rating scale of 1–5 is applied, wherein 5 denotes negligible or no change, 4 denotes slightly changed, 3 denotes noticeably changed, 2 denotes considerably changed, and 1 demotes much changed in color. The error bar for this rating is approximately +/−0.5 units.

| | DRY CROCKFASTNESS | | WET CROCKFASTNESS | |
|---|---|---|---|---|
| | Direct from Printer | After 2 min. at 180° C. | Direct from Printer | After 2 min. at 180° C. |
| Cyan Ink Ex. 1 | 3.0 | 4.5 | 1.5 | 3.0 |
| Magenta Ink Ex. 2 | 3.0 | 4.0 | 1.5 | 3.0 |
| Yellow Ink Ex. 3 | 3.0 | 4.0 | 1.5 | 3.0 |
| Black Ink Ex. 11 | 2.5 | 3.5 | 1.5 | 3.0 |
| Orange Ink Ex. 7 | 3.0 | 3.0 | 1.5 | 3.0 |
| Green Ink Ex. 8 | 4.5 | 4.0 | 2.5 | 4.0 |

What is claimed is:

1. An ink jet color set comprising:
   (a) a first magenta ink comprising a quinacridone pigment and carrier;
   (b) a second magenta ink comprising a quinacridone pigment and carrier, wherein the pigment is the same pigment as in the first magenta ink but is present as a weight percent in an amount from about 5–90% of that of the first magenta ink;
   (c) a first cyan ink comprising a copper phthalocyanine blue pigment and carrier;
   (d) a second cyan ink comprising a copper phthalocyanine blue pigment and carrier, wherein the pigment is the same pigment as in the first cyan ink but present as a weight percent in an amount from about 5–90% of that of the first cyan ink;
   (e) a yellow ink comprising a diarylide yellow pigment and carrier;
   (f) an orange ink comprising a diarylide orange pigment and carrier;
   (g) a green ink comprising a copper phthalocyanine green pigment and carrier, and
   (h) a black ink comprising a carbon black pigment and carrier.

2. The ink jet color set of claim 1, wherein the quinacridone pigment is PR 122.

3. The ink jet color set of claim 1, wherein the copper phthalocyanine blue pigment is PB 15:3.

4. The ink jet color set of claim 1, wherein the diarylide yellow pigment is PY 14.

5. The ink jet color set of claim 1, wherein the diarylide orange pigment is PO 34.

6. The ink jet color set of claim 1, wherein the copper phthalocyanine green pigment is PG 36.

7. The ink jet color set of claim 1, wherein the quinacridone pigment in the second magenta ink is present as a weight percent in an amount from about 5–50% of that of the first magenta ink.

8. The ink jet color set of claim 1, wherein the copper phthalocyanine blue pigment in the second cyan ink is present as a weight percent in an amount from about 5–50% of that of the first cyan ink.

9. The ink jet color set of claim 1, wherein the quinacridone pigment is PR 122; the copper phthalocyanine blue pigment is PB 15:3; the diarylide yellow pigment is PY 14; the diarylide orange pigment is PO 34; the copper phthalocyanine green pigment is PG 36; the quinacridone pigment in the second magenta ink is present as a weight percent in an amount from about 5–50% of that of the first magenta ink; and the copper phthalocyanine blue pigment in the second cyan ink is present as a weight percent in an amount from about 5–50% of that of the first cyan ink.

10. The ink jet color set of claim 1, wherein each ink is an aqueous ink jet ink.

11. The ink jet color set of claim 10, wherein the each said ink individually comprises an aqueous medium, a pigment as a colorant, and a polymer binder, wherein:
   each said ink has a viscosity in the range of about 10 to about 30 cP at 25° C.,
   each said polymer binder comprises one or more dispersed polymers,
   the binder to pigment weight ratio in each said ink is greater than about 2, and
   the total of binder plus pigment in each said ink is at least about 15% by weight of the ink.

12. The ink jet color set of claim 1, wherein diarylide yellow pigment is PY 14; and the diarylide orange pigment is PO 34.

13. A method for printing an image on a wide format recording medium with a system comprising a computer interconnected to an ink jet printer, adapted for the printing of said wide format medium, a pigmented aqueous ink jet color set comprising:
   (a) a first magenta ink comprising a quinacridone pigment and carrier;
   (b) a second magenta ink comprising a quinacridone pigment and carrier, wherein the pigment is the same pigment as in the first magenta ink but is present as a weight percent in an amount from about 5–90% of that of the first magenta ink;
   (c) a first cyan ink comprising a copper phthalocyanine blue pigment and carrier;
   (d) a second cyan ink comprising a copper phthalocyanine blue pigment and carrier, wherein the pigment is the same pigment as in the first cyan ink but present as a weight percent in an amount from about 5–90% of that of the first cyan ink;

(e) a yellow ink comprising a diarylide yellow pigment and carrier;

(f) an orange ink comprising a diarylide orange pigment and carrier;

(g) a green ink comprising a copper phthalocyanine green pigment and carrier, and (h) a black ink comprising a carbon black pigment and carrier.

14. The method of claim 13, wherein the wide format recording medium is a textile.

15. The method of claim 13, wherein the diarylide yellow pigment is PY 14.

16. The method of claim 13, wherein the diarylide orange pigment is PO 34.

17. The method of claim 13, wherein the quinacridone pigment is PR 122; the copper phthalocyanine blue pigment is PB 15:3; the diarylide yellow pigment is PY 14; the diarylide orange pigment is PO 34; the copper phthalocyanine green pigment is PG 36; the quinacridone pigment in the second magenta ink is present as a weight percent in an amount from about 5–50% of that of the first magenta ink; and the copper phthalocyanine blue pigment in the second cyan ink is present as a weight percent in an amount from about 5–50% of that of the first cyan ink.

18. The method of claim 13, wherein each ink is an aqueous ink jet ink.

19. The method of claim 18, wherein the each said ink individually comprises an aqueous medium, a pigment as a colorant, and a polymer binder, wherein:

each said ink has a viscosity in the range of about 10 to about 30 cP at 25° C., each said polymer binder comprises one or more dispersed polymers, the binder to pigment weight ratio in each said ink is greater than about 2, and the total of binder plus pigment in each said ink is at least about 15% by weight of the ink.

* * * * *